United States Patent [19]
Tomozawa

[11] 3,710,056
[45] Jan. 9, 1973

[54] TIME-DIVISION MULTIPLEX DELTA-MODULATION COMMUNICATION SYSTEM

[75] Inventor: Atsushi Tomozawa, Tokyo, Japan

[73] Assignee: Nippon Electric Company, Limited, Tokyo, Japan

[22] Filed: May 21, 1970

[21] Appl. No.: 37,496

Related U.S. Application Data

[63] Continuation of Ser. No. 640,181, June 27, 1967, abandoned.

[30] Foreign Application Priority Data

May 25, 1966 Japan ................................41/33381

[52] U.S. Cl. ..............................179/15 BY, 325/38 B
[51] Int. Cl. ..............................H04j 3/12
[58] Field of Search ..........179/15 BS, 15 AP, 15 BY; 325/38 B

[56] References Cited

UNITED STATES PATENTS

| | | | |
|---|---|---|---|
| 3,359,372 | 12/1967 | DeBurro | 179/15 BY |
| 2,798,118 | 7/1957 | Vantilburg | 179/15 BY |
| 3,127,475 | 3/1964 | Coulter | 179/15 BS |
| 3,057,962 | 10/1962 | Mann | 179/15 BS |
| 2,527,638 | 10/1950 | Kreer | 179/15 BS |
| 3,461,245 | 8/1969 | Johannes | 179/15 BS |

*Primary Examiner*—Kathleen H. Claffy
*Assistant Examiner*—David L. Stewart
*Attorney*—Sandoe, Hopgood and Calimafde

[57] ABSTRACT

In a time-division multiplex delta-modulation communication system, a frame of the multiplexed signal is composed of a plurality of subframes larger in number than the multiplexed transmission channels by at least one and defined by control bits, one of which is allotted to frame synchronization and the remainder of which are allotted to channel monitoring and the like. A respective one of the control bits is transmitted every frame period while the respective channel information is transmitted every subframe period.

2 Claims, 5 Drawing Figures

INVENTOR.
ATSUSHI TOMOZAWA
BY
Hopgood & Calimafde
ATTORNEYS

INVENTOR.
ATSUSHI TOMOZAWA
BY
Hopgood & Calimafde
ATTORNEYS

INVENTOR.
ATSUSHI TOMOZAWA

BY

Hopgood & Calimafde
ATTORNEYS

TIME-DIVISION MULTIPLEX DELTA-MODULATION COMMUNICATION SYSTEM

This application is a continuation of application Ser. No. 640,181, filed June 27, 1967, now abandoned.

BACKGROUND OF THE INVENTION

In the conventional time-division multiplex PCM communication system for several tens of channels, a frame is arranged in such a manner that eight bits are allocated to each channel, seven bits of each of the eight being used for the transmission of an audio signal, and the remaining bit for signaling. One bit is inserted in each frame for frame synchronization.

With this arrangement, a pattern which rarely appears at bit positions other than that of the frame synchronization bit, must be transmitted at the frame synchronization bit position in order to distinguish it from other bits. Such a pulse code pattern is a mark and space alternatingly appearing once a frame period.

With time division multiplexed PCM employing delta-modulation, only one bit per one sampling interval for each channel is used for the transmission of a speech signal. In other words, a conventional code construction without signalling information contains frame synchronizing pulses of the interval equal to the sampling interval and information bits, each of which is assigned to a particular channel included in each frame. The use of an additional bit for signalling, that is, the use of two bits for each channel is not economical, because the necessary bandwidth for the transmission of the monitoring and dialing signal is appreciably narrower than that of the speech signal. Consequently, the employment of a frame arrangement similar to the conventional PCM communication system is wasteful. Moreover, the above mentioned conventional frame synchronization pattern for PCM systems is not applicable because the occurrence probability of patterns having a repetition period of two or more integral multiples of the sampling period is high. Hence, a distinct frame synchronization pattern should be employed.

OBJECT OF THE INVENTION

It is the object of the present invention to provide a time-division multiplex delta-modulator in which a novel frame structure and a control pulse pattern is employed to economically transmit monitoring and dialing signals.

SUMMARY OF THE INVENTION

In the frame arrangement of the present invention, one frame is composed of a plurality of subframes having periods equal to the sampling period of the delta-modulation. Each subframe is in turn composed of speech bits (each of which is assigned to a channel) and at least one monitoring and dialing signal or frame-synchronization signal bit (control bit). The control bits contained in one frame are assigned to frame synchronization or channel signalling for each channel. By employing a frame arrangement of this type, the number of the control bits in one frame is made smaller than the number of speech bits.

Also, according to the present invention, the frame synchronization pattern can be composed of an unvarying bit pattern which is common to all the frames, while the remaining control bits may vary for each frame. For example, one of the control bits may be switched on and off once a frame period, the other may remain zero. Thus, the two values are distinctive and the frame synchronization pattern can be distinguished from other patterns observed at other bit positions, whereby frame synchronization is rendered possible.

The above mentioned and other features and objects of this invention and the manner of attaining them will become more apparent and the invention itself will best be understood by reference to the following description of embodiments of the invention taken in conjunction with the accompanying drawings.

Figure 5:
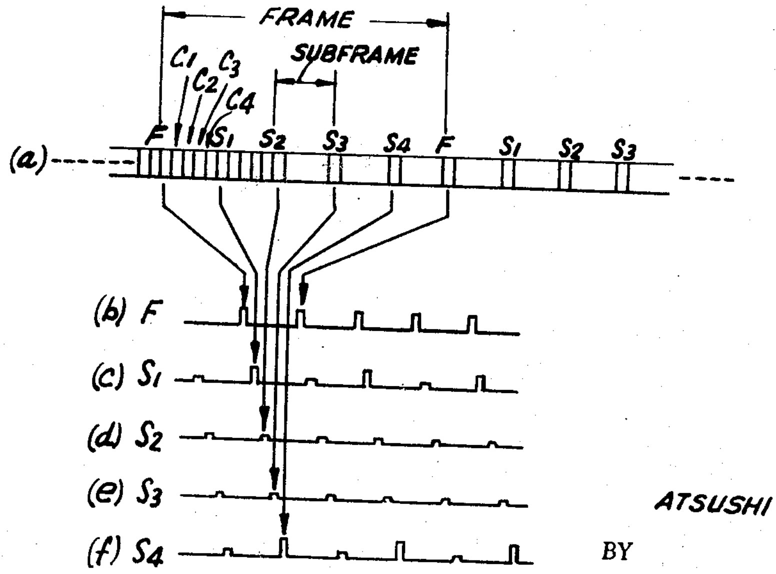
FIG. 5 schematically indicates the frame arrangement employed in the described embodiment.

In the embodiment to be described, it will be assumed that the number of channels is four and that the frame is arranged as shown in FIG. 5(*a*). That is, one frame is composed of five subframes, each of which is composed of five bits. The number of the control bits contained in each frame is five, to which the symbols F, $S_1$, $S_2$, $S_3$ and $S_4$ are respectively assigned. The control bit F is assigned to the frame synchronization, while the four remaining bits $S_1$, $S_2$, $S_3$ and $S_4$ are assigned to channel signalling (dial signal and d.c.-level monitoring).

In the example, an all mark pattern ( . . . 1111 . . . )is used as the frame synchronization pattern, as indicated in FIG. 5(*b*), while a pair of patterns, one of which is all space ( . . . 000 . . .), and the other of which is on-off ( . . . 010101 . . . ), shown in FIGS. 5(*c*) to 5(*f*), are used as the channel signalling patterns according to the binary signalling information.

By employing the afore-mentioned bit arrangement, the number of channel signalling bits becomes one fifth of that of the audio signal bits, with the result that a frame is economically utilized. Also, since the frame synchronization pattern never appears in the control bit positions for signalling, the control bits are not erroneously identified as the frame synchronization pattern.

It will now be shown with reference to FIGS. 1 to 4 that the delta-modulation transmission system employing the above-mentioned frame and subframe arrangement are realizable by means of conventional circuit elements.

Figure 1:
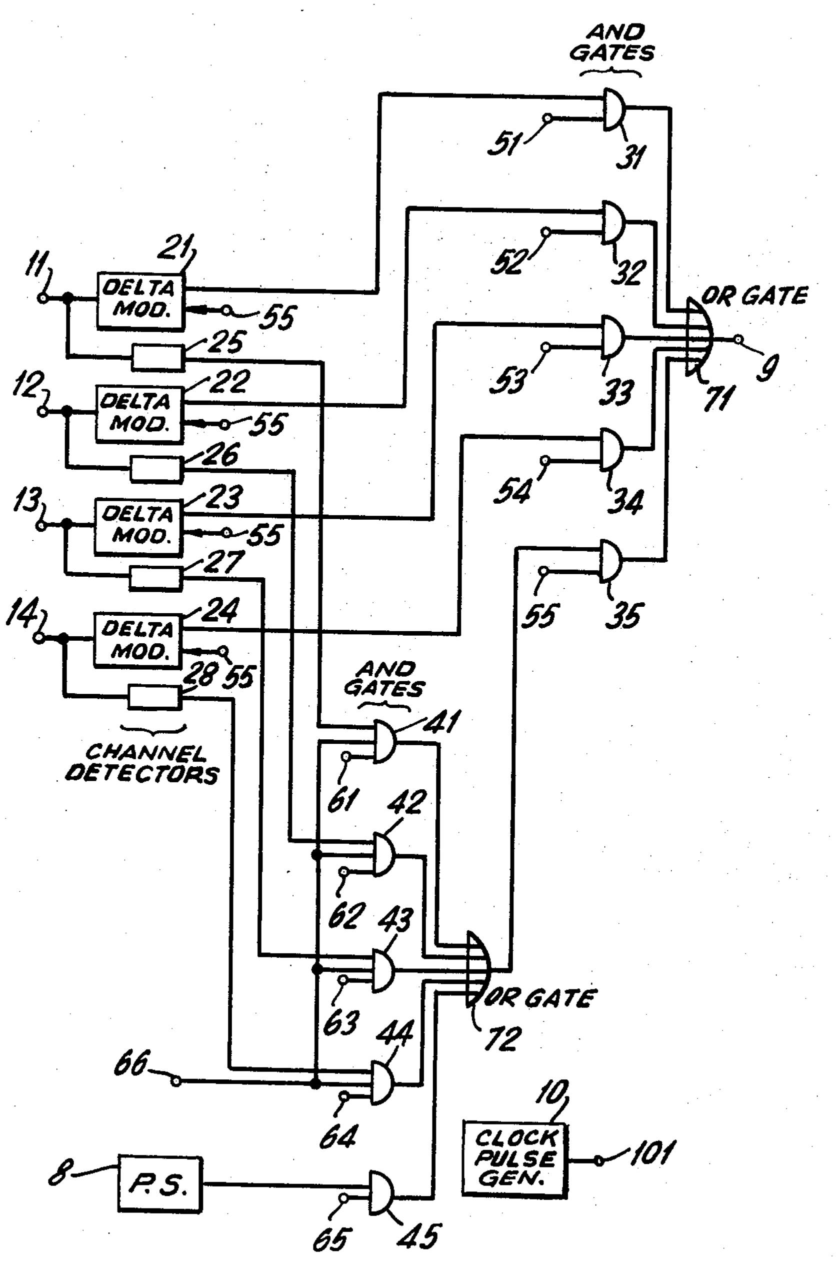
FIG. 1 is a block schematic diagram of a transmitter according to the present invention.
Figure 2:
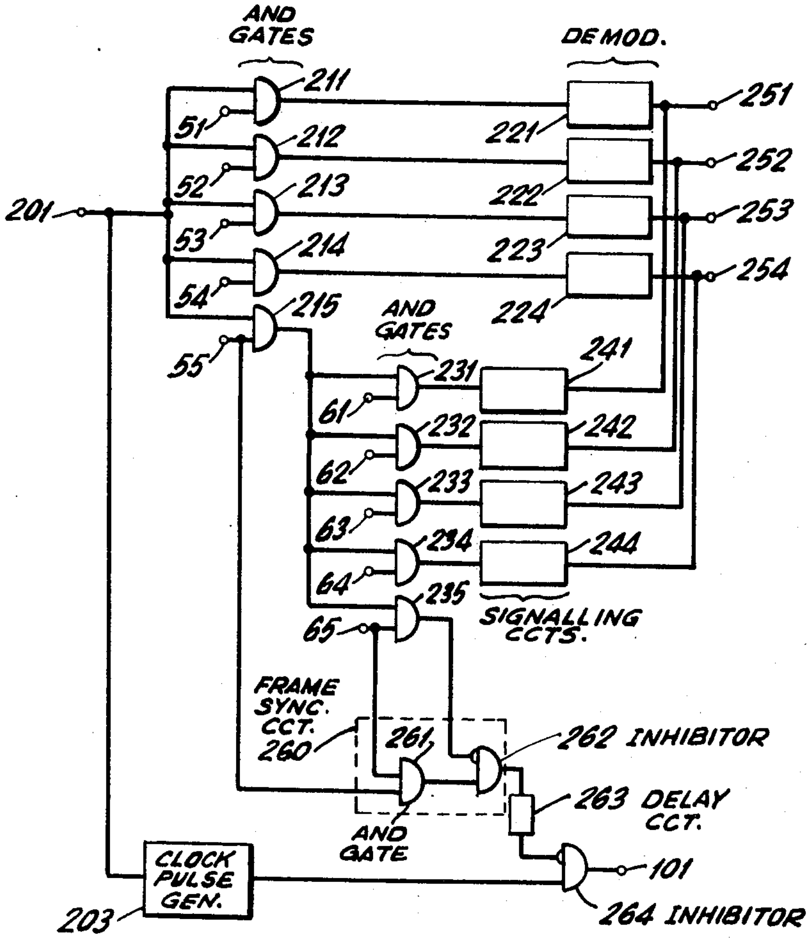
FIG. 2 similarly shows a receiver according to the invention.
Figure 3:
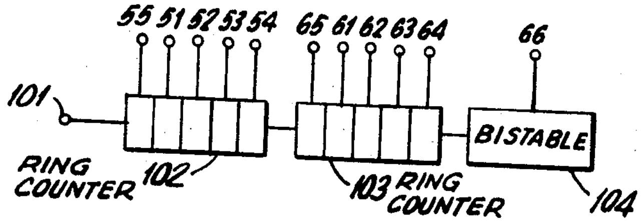
FIG. 3 is a block diagram of a timing device for the transmitter and receiver respectively shown in FIGS. 1 and 2.

The transmitting equipment is composed as shown in FIG. 1 and includes a timing device as shown in FIG. 3. Similar reference numerals at the terminals in FIGS. 1 and 3 show connections. The reference numerals in FIG. 4 respectively pertain to waveforms observed at the terminals designated by similar reference numerals in FIG. 3. The receiving equipment is composed as shown in FIG. 2 and includes a timing device having a construction similar to that used in the transmitting equipment. The terminals in the receiver and the timing device, designated by similar reference numerals, are connected as in the case of the transmitting equipment.

Figure 4:
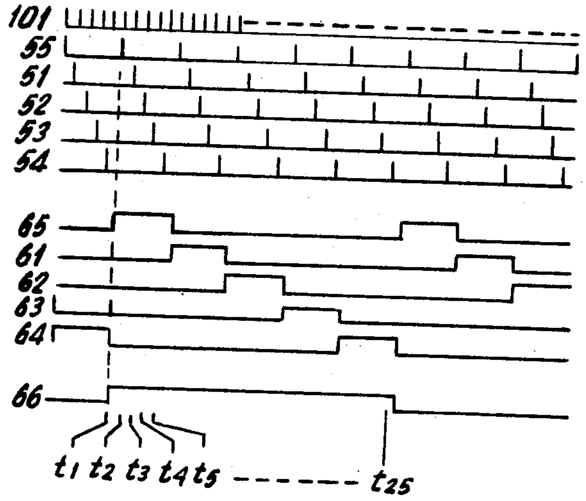
FIG. 4 illustrates the waveforms observed at the various points in FIG. 3.

In the transmitting equipment, a clock pulse is applied from a clock pulse generator 10 to the timing device of FIG. 3. The timing device, by means of two five-stage ring counters 102 and 103 and a bistable device 104, generates five-phase first timing pulses 51 to 55, five-phase second timing pulses 61 to 65, and a pattern control pulse 66 as shown in FIG. 4.

In the transmitting equipment, delta-modulators 21 to 24 allocated to the audio channels sample speech signals applied to input terminals 11 to 14, under the control of a supplied sampling pulse 55, and generate coded outputs which are respectively applied to AND-gates 31 to 34. Channel detector circuits 25 to 28 (each of which may be composed of an RC integrator and a Schmitt circuit) which are also respectively connected to the input terminals 11 to 14 detect, via the direct-current potentials of the input terminals, the on-hook, off-hook states of the channels. The detector circuits generate digital outputs 1 to 0 in response to said states, which are then supplied to AND-gates 41 to 44. Since the delta-modulator and the channel detector circuits can be constructed in the known manner and since the gist of the invention does not reside in the structure of these circuits, their further explanation will be omitted.

The first timing pulses 51 to 54, which are shifted in time by one bit interval from each other and each of which has one subframe period, are applied to the AND-gates 31 to 34. Thus, it will be understood that the delta-modulated signal from the input terminal 11 is obtained at the output of an OR-gate 71 at time positions $t_2$, $t_7$, $t_{12}$, . . . . Similarly, the delta-modulated signal from the input terminal 12 is obtained at the time position $t_3$, $t_8$, $t_{13}$, . . . . The time points $t_4$, $t_9$, $t_{14}$, . . . and $t_5$, $t_{10}$, $t_{15}$, . . . correspond, respectively, to the signals from the terminals 13 and 14.

The second timing pulses 61 to 64 shifted in time by one subframe period from each other, and the pattern control pulse 66 switched on and off at one frame period, are applied to the AND-gates 41 to 44, to which the channel signal outputs are also applied.

The output of a constant number generator circuit 8 (e.g., a power supply) which continuously generates a signal corresponding to the digital value "1", is applied together with one of the second timing pulses 65 to AND-gate 45 for insertion of the frame synchronization pattern. Thus, an output of an OR-gate 72 is produced for each subframe as a logical sum of the synchronization pulse and the channel signalling pulse supplied from channel detector circuits 25 to 28. In this case, the output of OR-gate 72 is always "1" at the time positions of the frame synchronization bit, while it is either ( . . . 000 . . . )or ( . . . 101010 . . . ) corresponding to each of the outputs of the channel detector circuits 25 to 28 at the time positions other than the frame synchronization bits. The output of the OR-gate 72 is applied to an AND-gate 35 together with one of the first timing pulses 55, with the result that it is inserted in the positions of the subframe control pulse. From the foregoing explanation, it will be understood that an output having the frame arrangement shown in FIG. 5($a$) is obtained at an output terminal 9 of OR-gate 71.

At the receiving equipment, the multiplexed signal is separated by a process inverse to that performed at the transmitting equipment. In other words, the received multiplex delta-modulation code is separated by subframe period and then the channel signalling bits contained in the control pulse train are separated from each of the separated subframes.

At first, a case is illustrated where the frame synchronization is in the normal state, that is, where the position of the frame synchronization pulse contained in the received signal coincides with the frame synchronization position $t_1$ in the timing device of the receiving equipment. In this case, the delta-modulated codes applied to an input terminal 201 are separated channel by channel in response to the first timing pulses applied to the AND-gates 211 to 214. The separated codes are then respectively applied to demodulators 221 to 224 for demodulation. Also, the control pulse is separated in response to one of the first timing pulses 55 and then transmitted to the AND-gates 231 to 235. The channel signalling bits and frame synchronization bits are further separated in response to the second timing pulses 61 to 65. The signalling bits are applied respectively to the signalling circuits 241 to 244 and then to the output terminals 251 to 254 together with the audio signals supplied from the demodulators 221 to 224.

The bit synchronization necessary for signal reproduction can be realized by a clock pulse circuit responsive to the input multiplex signal in the known manner.

Further, frame synchronization in this embodiment is realized by a known method, i.e., the so-called one bit shift hunting method. Briefly, when frame synchronization is correctly maintained in the above-mentioned channel separation process, the output of AND-gate 235 is the frame synchronization pattern, that is, ( . . . 1111 . . . ). Therefore, if the output includes a "0", the synchronization is not normal.

Frame synchronization circuit 260 "finds" the stepping out of synchronization. If the output of an AND-gate 261 supplied with the first and second timing pulses 55 and 65 becomes "1" only at the time position $t_1$, the same output pulse "1" is inhibited at inhibitor gate 262 as long as the output of the AND-gate 235 is "1". In contrast, if the output of the AND-gate 235 is "0", the same output pulse "1" is not inhibited at the gate 262. The produced pulse of the inhibitor gate 262 is supplied through a delay circuit 263, which has a delay time equal to half a clock period, to another inhibitor gate 264, as an inhibiting input. Therefore, the clock pulse supplied from the clock pulse generator 203 is inhibited by one bit only when frame synchronization has collapsed. Since the clock pulses are successively inhibited at gate 264 so long as frame synchronization is collapsed, the phase shift is caused bit by bit between the received multiplex pulse and the output of the timing device of FIG. 3 to ultimately restore the frame synchronization.

From the foregoing explanation, it will be understood that the present invention provides a delta-modulation communication system having a novel frame arrangement, wherein channel signalling and dialing information is economically transmitted without adversely affecting frame synchronization. It will be apparent that various modifications are possible. For example, a plurality of the control bits including frame synchronization bits may be incorporated into one subframe. Alternatively, one or more subframes may be added to the frame arrangement of FIG. 5. Also the frame synchronization pulses may have any arbitrary code pattern. Moreover, it will be obvious that the described control signal can be replaced by a binary signal having a lower repetition frequency.

While the principles of the invention have been described in connection with specific apparatus, it is to be clearly understood that this description is made only by way of example and not as a limitation to the scope of the invention as set forth in the objects thereof and in the accompanying claims.

I claim:

1. A time-division multiplex delta-modulation communication system for communicating a multiplexed delta-modulation signal having successive frames, each of said frames being composed of subframes larger in number than the number of multiplexed channels of said delta-modulation signal by at least one and defined by a plurality of control bits and a plurality of information bits corresponding to the number of said channels, at least one of the control bits contained in each frame serving as a frame synchronization code and the remainder of said control bits serving as signalling information codes representing two different states of signalling information of said channel; said system including a transmitter comprising means for delta-modulating each of a plurality of information signals to be transmitted, the number of said information signals being equal to the number of said multiplexed channels; means for producing said signalling information codes from said information signals; means for producing said frame synchronization code; means for arranging in time-serial fashion said signalling information codes and said frame synchronization codes to provide signalling bits for control bit positions such that the control bits of any one particular subframe represent the signalling information of one corresponding information signal and signalling information corresponding to all information signals is transmitted during one frame, and means for cyclically sampling said delta-modulated information signals and said signalling bits to form said subframes and to define said frames, wherein said frame synchronization code consists of an all-mark or an all-space code pattern, and said two signalling information codes have different code patterns from said frame synchronization code and each other.

2. The time-division multiplex delta-modulation communication system claimed in claim 1, further comprising the combination of a receiver for said system comprising means for generating clock pulse in response to a clock frequency component of said multiplex signal, means for separating said multiplexed signal channel by channel; means for demodulating each said separated signals and said signalling codes; and means for maintaining synchronization with reference to said frame synchronization signal.

* * * * *